United States Patent [19]
Barron et al.

[11] Patent Number: 6,019,437
[45] Date of Patent: Feb. 1, 2000

[54] VEHICLE HYDRAULIC BRAKING SYSTEMS INCORPORATING MICRO-MACHINED TECHNOLOGY

[75] Inventors: Richard J. Barron, Ann Arbor; Edward N. Fuller, Manchester; Gerald M. Sivulka, Ann Arbor; Gregory P. Campau, Plymouth; Charles Darnell, Ypsilanti, all of Mich.

[73] Assignee: Kelsey-Hayes Company, Livonia, Mich.

[21] Appl. No.: 08/865,466

[22] Filed: May 29, 1997

Related U.S. Application Data

[60] Provisional application No. 60/018,607, May 29, 1996.

[51] Int. Cl.[7] .................................................. B60T 8/34
[52] U.S. Cl. ...................................... 303/113.1; 303/116.1
[58] Field of Search .................................... 303/3, 10, 15, 303/167, 168, 186, 187, 188, 116.1, 116.2, 119.1, 119.2

[56] References Cited

U.S. PATENT DOCUMENTS

| | | |
|---|---|---|
| 4,434,813 | 3/1984 | Mon . |
| 4,581,624 | 4/1986 | O'Connor . |
| 4,821,997 | 4/1989 | Zdeblick . |
| 4,824,073 | 4/1989 | Zdeblick . |
| 4,943,032 | 7/1990 | Zdeblick . |
| 4,959,581 | 9/1990 | Dantlgraber . |
| 4,966,646 | 10/1990 | Zdeblick . |
| 5,029,805 | 7/1991 | Albarda et al. . |
| 5,054,522 | 10/1991 | Kowanz et al. . |
| 5,074,629 | 12/1991 | Zdeblick . |
| 5,096,643 | 3/1992 | Kowanz et al. . |
| 5,131,729 | 7/1992 | Wetzel ........................ 303/113 AP |
| 5,133,379 | 7/1992 | Jacobsen et al. . |
| 5,142,781 | 9/1992 | Mettner et al. . |
| 5,161,774 | 11/1992 | Engelsdorf et al. . |
| 5,178,190 | 1/1993 | Mettner . |
| 5,216,273 | 6/1993 | Doering et al. ................ 251/129.17 |
| 5,217,283 | 6/1993 | Watanabe . |
| 5,238,223 | 8/1993 | Mettner et al. . |
| 5,267,589 | 12/1993 | Watanabe . |
| 5,271,431 | 12/1993 | Mettner et al. . |
| 5,309,943 | 5/1994 | Stevenson et al. . |
| 5,375,919 | 12/1994 | Furuhashi ........................ 303/119.1 |
| 5,400,824 | 3/1995 | Gschwendtner et al. . |
| 5,445,185 | 8/1995 | Watanabe et al. . |
| 5,458,405 | 10/1995 | Watanabe ........................... 303/173 |
| 5,566,703 | 10/1996 | Watanabe et al. . |

*Primary Examiner*—Chris Schwartz
*Attorney, Agent, or Firm*—MacMillan, Sobanski & Todd, LLC

[57] ABSTRACT

Hydraulic or electro-hydraulic braking systems which include at least one wheel braking device and micro-machined technology, such as microvalves, are described herein. The use of the microvalves helps to eliminate audible noise produced in the hydraulic systems as well as allows for reduced package size of the system. In particular, many of the braking systems described herein have Anti-lock Braking System (ABS) capabilities, and as such employ apply microvalves, dump microvalves and changeover microvalves. The microvalves may be digitally or proportionally controlled for selectively controlling the pressure supplied to the wheel brake cylinders.

6 Claims, 11 Drawing Sheets

VEHICLE HYDRAULIC BRAKING SYSTEMS INCORPORATING MICRO-MACHINED TECHNOLOGY

This application claims the benefit of U.S. Provisional No. 60/018,607 filed May 29, 1996.

BACKGROUND OF THE INVENTION

Motor vehicles are commonly provided with brake systems to retard the rotation of the vehicle wheels. While all electric (non-hydraulic) brake systems have been proposed, most vehicles in use today employ a hydraulic or an electro-hydraulic braking system. In a conventional hydraulic vehicle braking system, the brake pedal is operatively connected to a master cylinder. The movement of the brake pedal causes a piston within the master cylinder to move, thereby forcing hydraulic fluid throughout the brake system and into cylinders located at each wheel. The pressurized hydraulic fluid then causes a piston located within the wheel brake cylinders to move. The movement of the brake piston causes a first friction surface to move into contact with a second friction surface operatively connected to the rotating wheel, thereby braking the wheel. A typical electro-hydraulic brake system includes a similar hydraulic system but additionally includes one or more sensors, such as a force sensor coupled to a vehicle's brake pedal, which develops a signal which is indicative of a driver's demand for braking. This signal is sent to an electronic control unit which in turn operates an electric motor to drive a pump to send the pressurized hydraulic fluid to the vehicle's brakes to develop the demanded braking force. Such electro-hydraulic brake systems are typically able to electronically control the brake pressure at each of the vehicle's wheels independently of the brake pressure at other ones of the vehicle's wheels.

The ability to independently control the braking force at each of the vehicle's wheels, together with certain special sensors, enables operation of a vehicle brake system in various special modes of operation. One of these special modes of operation is an anti-lock braking mode of operation, commonly referred to as ABS (for Anti-lock Brake System). Sensors in the vehicle brake system monitor the speed of the vehicle's wheels during braking. If the braking force demanded at a brake for a vehicle wheel causes the wheel to slip, the brake system can momentarily reduce the braking force of the brake at that wheel to allow the wheel to stop slipping, and thus provide optimal braking for the vehicle.

Another of these special modes of operation is traction control. During vehicle acceleration, a vehicle wheel may lose traction, and begin to spin. In the traction control mode of braking, the brake system is electronically actuated, without the driver stepping on the vehicle brake pedal, to individually brake the spinning wheel. When the wheel has slowed sufficiently to regain traction, the brake is released.

Figure 1:
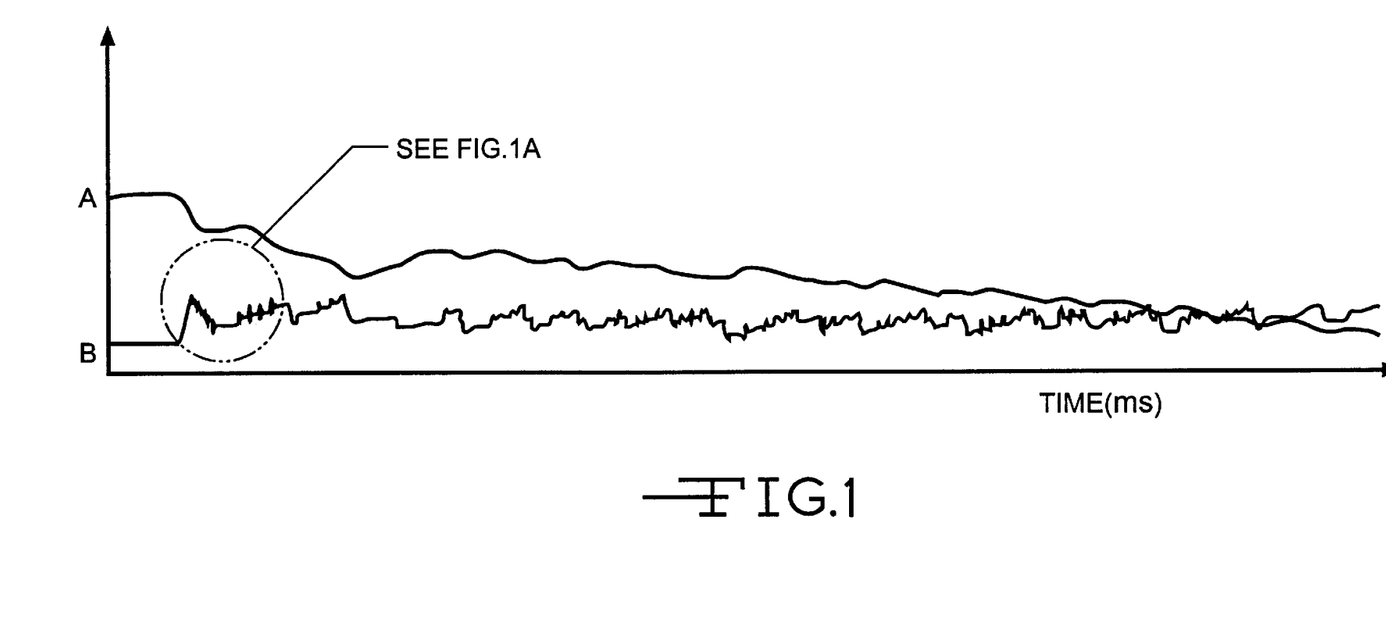
Figure 1A:
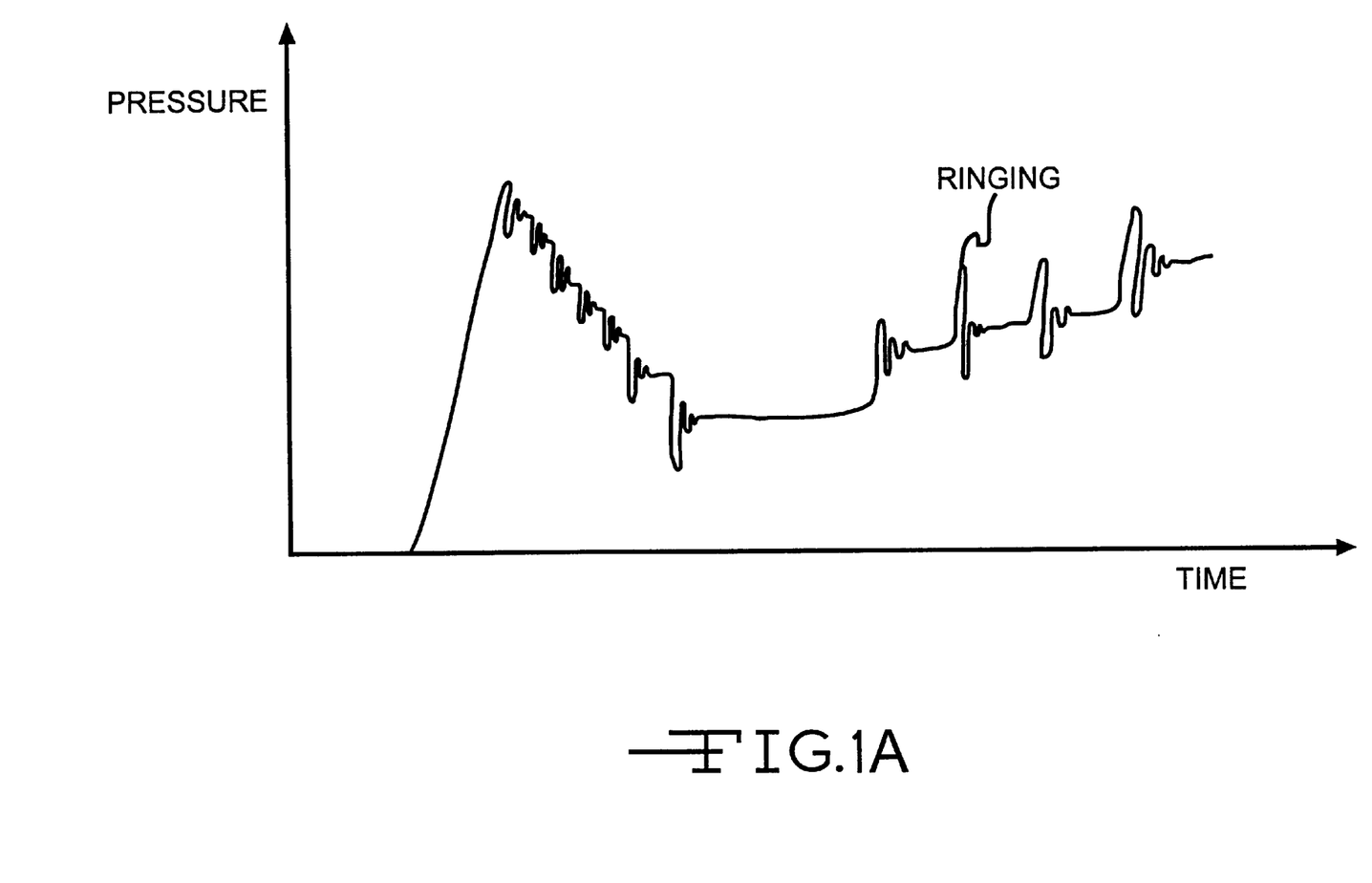

In most hydraulic and electro-hydraulic braking systems, solenoid valves are used to control the brake pressure in the brake lines. Solenoid valves may be digitally controlled in that the solenoid is either energized or deenergized and the valve is thereby moved to either a fully open position or a full open position. Partially open or throttled positions of the valve are brief transient positions during movement between the fully closed and the fully open position. During use, digitally controlled solenoid valves respond rapidly to actuation signals, which causes a fluid hammer effect. This problem is shown in FIGS. 1 and 1a. FIG. 1 shows a graph of a pressure profile during the operation of a conventional ABS in a typical light vehicle brake system. The horizontal axis represents time, with each division corresponding to 100 milliseconds. Both wheel speed and brake pressure are indicated on the vertical axis. Graph line A indicates the wheel speed and graph line B shows the front brake pressure. Graph line B illustrates the sudden changes in front brake pressure and pressure spikes which are present in the brake line during operation of the ABS. FIG. 1a shows an expanded view, corresponding to area labeled as view "a" in FIG. 1, of the front brake pressure. The pressure spikes shown in FIG. 1a can be as high as 400 to 600 pounds per square inch (psi). A rapid oscillation in a signal or pressure is referred to as "ringing." The expanded view in FIG. 1a also illustrates the ringing which occurs on the brake line. Switching the state of a conventional solenoid valve causes a damped oscillation of the pressure (the ringing) in the brake line. The ringing radiates along the length of the brake line, including under the vehicle, and causes the brake line to physically vibrate. The vibration is perceived by occupants of the vehicle as audible noise. Ideally, it would be desirable to provide a hydraulic or electro-hydraulic braking system in which this audible noised is reduced.

SUMMARY OF THE INVENTION

This invention is directed to hydraulic or electro-hydraulic braking systems which use micro-machined technology, such as microvalves, in the hydraulic system for reducing the audible noise produced therein. The use of microvalves also allows for reduced package size of the systems. In particular, the hydraulic or electro-hydraulic braking systems according to this invention employ, inter alia, apply microvalves, dump microvalves, changeover microvalves, and micro-machined transducers.

In a preferred embodiment of the invention, an hydraulic braking system includes a braking device adapted to provide a braking force to at least one wheel for braking the vehicle and at least one main hydraulic conduit. The main hydraulic conduit extends from a source of pressurized brake fluid to the braking device. The source of pressurized brake fluid and the main hydraulic conduit cooperate to supply pressurized fluid to the braking device. The hydraulic system further includes at least one microvalve disposed in the main hydraulic conduit between the source and the braking device. The microvalve is adapted to selectively and proportionally control the pressurized brake fluid supplied to the braking device.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 1 and 1a are graphs of a pressure profile during the operation of a conventional electro-hydraulic braking system. (FIG. 1a is an enlarged view of the area labeled "a" in FIG. 1.)

DETAILED DESCRIPTION OF THE INVENTION

Figure 2:
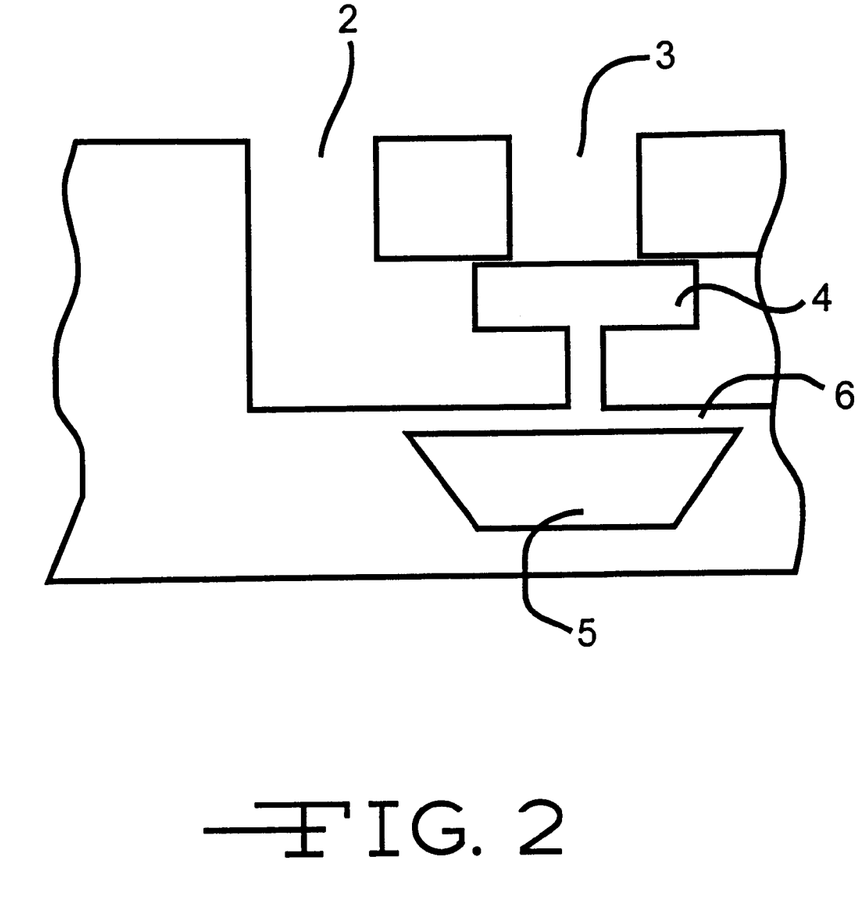
FIG. 2 is a schematic representation of a microvalve.

Referring now to the drawings, there is illustrated in FIG. 2, a schematic representation of a microvalve. As used herein, a microvalve is any type of flow control device which is formed in a semiconductor material. Typically, a microvalve is a multi-layered structure which is formed in a silicon or silicon based housing. As shown in FIG. 2, the microvalve generally includes an inlet port 2 which is separated from an outlet port 3 by an actuating device 4. Many microvalves include a closed chamber 5 having a flexible member 6 which is operatively connected to the actuating device 4 for controlling the flow from the inlet 2 to the outlet 3 of the microvalve. Various methods are used to bias the flexible member 6 and thereby open and close the microvalve.

A particular type of microvalve has a chamber which is etched in silicon, filled with fluid, and hermetically sealed. The fluid expands when heated and the expansion biases a flexible wall. The biasing of the wall into the fluid passageway between the inlet port and the outlet port cuts off the fluid path, thereby closing the microvalve. When the fluid cools, it contracts and the wall of the chamber returns to its original position, thereby restoring the fluid path and opening the microvalve. This type of microvalve, having an actuator depending upon thermal expansion and contraction for operation, may be referred to as a thermally actuated microvalve.

The fluid in the chamber of this type of microvalve may be heated in a number of ways. For example, resistive elements may be etched in silicon inside the chamber and may be electrically connected to a controlled voltage or current source. When a current is passed through the resistive elements, the elements generate heat and thereby heat the fluid in the chamber. In another example, radio frequency energy or light energy may be focused on the fluid in the cavity. In another example, conductive, convective, or radiated heating of the material surrounding the chamber may be used to heat the fluid in the chamber. Another type of microvalve includes a flexible diaphragm instead of the wall of a closed chamber as the flexible member. An electrode biases the flexible diaphragm to cover the microvalve inlet. Still another type of microvalve uses piezoelectric forces to move a flexible member so as to selectively actuate the valve.

While any type of microvalve may be used with this invention, the microvalve employed in the hydraulic or electro-hydraulic braking system according to the invention described herein preferably has the following characteristics:

Maximum pressure: 3000 psi (steady state) 5000 psi (spike)

Response time: <4 milliseconds (ms)

Flow rate: Equivalent to 0.75 mil diameter orifice

Temperature: −20° C. to 125° C. (Operating range)

Figure 3A:
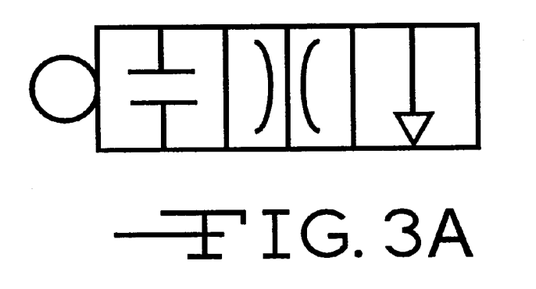
FIGS. 3a through 3c are schematic symbol representations of various microvalves which may be used according to this invention.
Figure 3B:
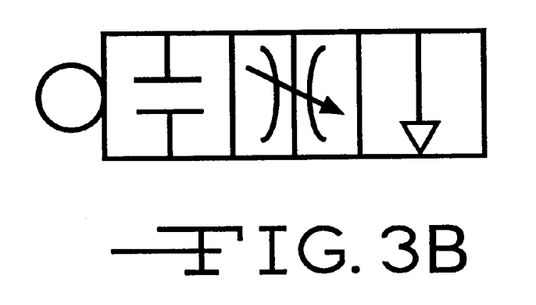
Figure 3C:
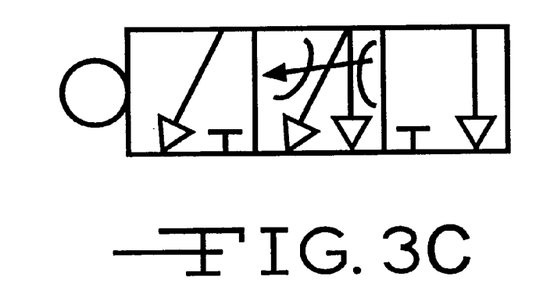

Schematic representations of several types of microvalves are shown in FIGS. 3a through 3c with unique valve symbols. As shown therein, a circle is used to represent the associated actuator symbol. In FIG. 3a, the microvalve symbol shows three states: an open state, a flow restricted state, and a closed state. Unlike a digitally controlled solenoid valve, which is essentially open or closed, a microvalve may be controlled with a smoother transition, upon actuation, from its present position (e.g. open) to the opposite position (e.g. closed). In FIG. 3a, this smoother transition has been represented symbolically as an intermediate flow restricted position between the actuated state and the unactuated state, which flow restricted position is momentarily occupied during the transition between the open and closed positions.

Microvalves may be normally open or normally closed and are shown in the figures in their unactuated (normal) position. Preferably, a microvalve utilized in the braking systems according to the invention is configured for a controlled rate of flow through the microvalve. As shown in FIG. 3b, the preferred microvalve has three states; a fully open state, a variable flow restricted state, and a fully closed state. The microvalve shown in FIG. 3b may be referred to as a proportionally controlled microvalve because the flow rate through the microvalve is proportional to a control signal applied thereto. For example, in a normally open proportionally controlled microvalve using resistive elements to heat a fluid in an expansion chamber, a current of 0 micro-amps corresponds to 100% of the flow rate (fully open), a current of X micro-amps corresponds to 0% of the flow rate (fully closed), and a current of 50% of X micro-amps corresponds to the position of the microvalve permitting a flow rate equal to 50% of the flow rate in the full open position.

A proportionally controlled microvalve, as shown in FIG. 3b, may be used in place of the microvalve shown in FIG. 3a by utilizing appropriate control signals to transition the proportionally controlled microvalve between its fully open and fully closed states. For example, a digital control signal could be applied to the proportionally controlled microvalve with a value of 0 corresponding to an off state in which no current (0 micro-amps) is supplied to the proportionally controlled microvalve and the proportionally controlled microvalve is fully open, and a value of 1 corresponding to a maximum on state in which the current required to fully close the valve (X micro-amps) is supplied to the proportionally controlled microvalve. In this case, the proportionally controlled microvalve operates essentially as the microvalve described with respect to FIG. 3a. Specifically, the proportionally controlled microvalve would have three states; an open state, a flow restricted state, and a closed state.

FIG. 3c shows a schematic symbol for a proportionally controlled 3-way microvalve. This microvalve operates similar to the microvalve in FIG. 3b, as described above, but provides proportional control between two fluid paths. Specifically, the microvalve shown in FIG. 3c is configured to transition between being the following states:

A. fully open to a first fluid path and fully closed to a second fluid path;

B. variable flow restricted in both the first and second fluid paths; and

C. fully closed to the first fluid path and fully open to the second fluid path.

In other words, with the appropriate control signal, the microvalve shown in FIG. 3c may be Y% open to the first fluid path and Z% open to the second fluid path.

As described above, a solenoid valve opens essentially instantaneously once the force required to open it is achieved. Similarly, the solenoid valve essentially closes instantaneously once the force to close it is achieved. The transport of the plunger can occur in under one millisecond and causes the fluid hammer effect, namely the pressure spikes in the brake line, and the noise due to ringing. Furthermore, the transitioning of a solenoid valve itself causes significant audible noise.

A significant advantage is achieved by utilizing microvalves in the hydraulic circuit according to the invention. Specifically, in contrast to a solenoid valve, the speed of opening and closing of a microvalve can be easily controlled to provide a smoother transition which reduces the fluid hammer effect and subsequent ringing, thereby substantially reducing the noise in the hydraulic or electro-hydraulic braking system. Also, in comparison with a solenoid valve, the transitioning of a microvalve is essentially silent. By utilizing a microvalve which provides a variable flow restriction, the opening and closing of the microvalve can be performed at a controlled rate and the fluid hammer effect can be eliminated altogether. Moreover, using microvalves in place of solenoid valves achieves a significant size reduction and better component integration.

Figure 4:
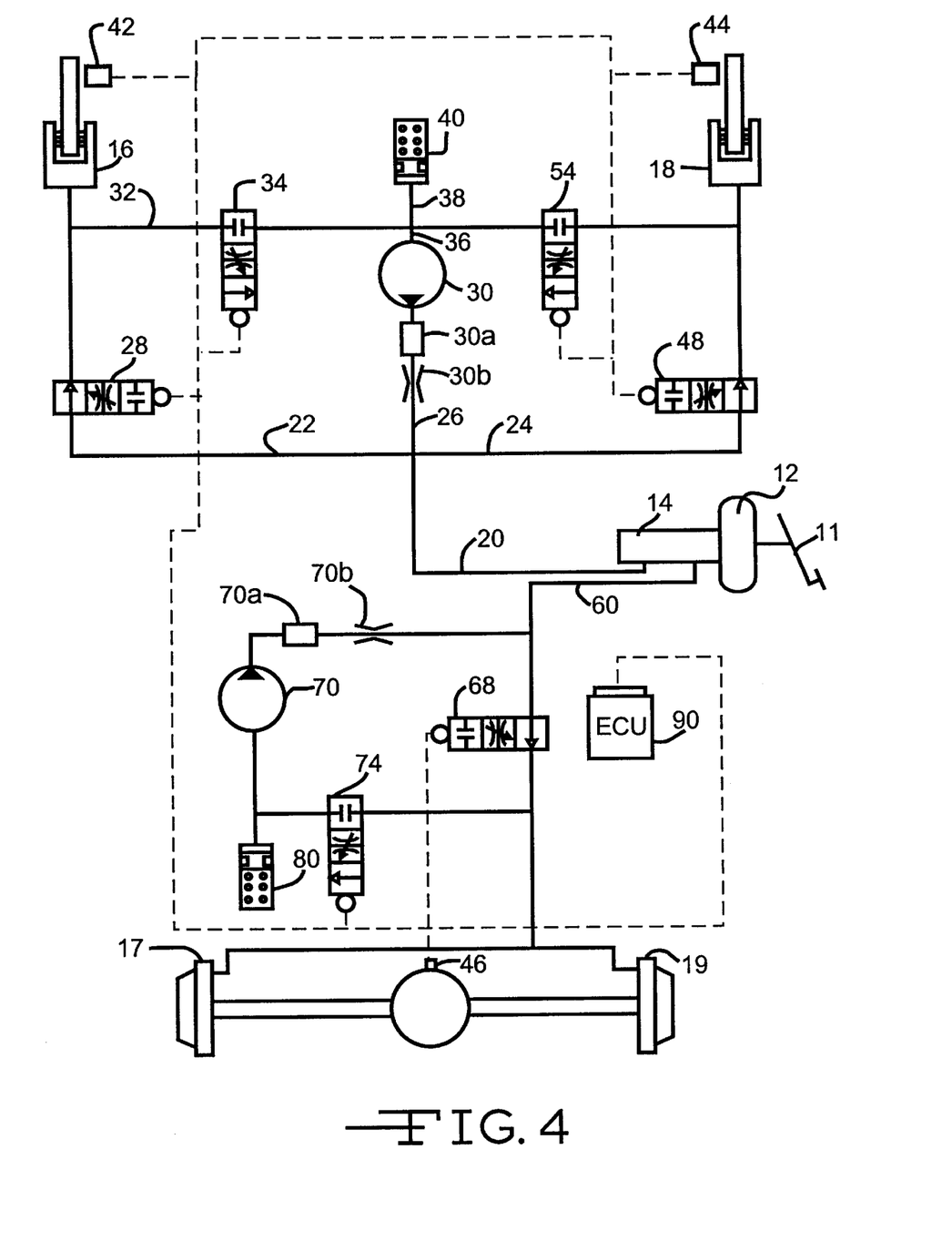
FIG. 4 is a schematic representation of a first embodiment of an electro-hydraulic brake system according to the invention.

FIG. 4 shows a schematic representation of a first embodiment of an ABS-capable brake system according to the invention. A plurality of microvalves and hydraulic components, as described below, are used in the illustrated brake system. The microvalves and components are housed in a hydraulic control unit (HCU) comprising a housing body having a plurality of bore cavities in which the microvalves and components are seated. Passageways or conduits are formed in the HCU body to provide fluid communication between the various microvalves and components. In FIG. 4, hydraulic fluid connections between components are represented as solid lines.

As shown in FIG. 4, the first embodiment of the brake system according to the invention includes a brake pedal 11 which is connected to a brake booster 12 and a master cylinder 14. The brake booster 12 provides for a force or "boost" to the master cylinder 14 which assists the pedal force created by the driver to actuate the master cylinder 14 so that the master cylinder 14 acts as a source of pressurized brake fluid to the brake system. The master cylinder 14 is connected to a front brake circuit and a rear brake circuit through a pair of brake lines 20 and 60, respectively.

The front brake circuit includes front wheel brake cylinders 16 and 18 which are connected to the master cylinder 14 via a line 20. The line 20 divides into a set of lines 22, 24 and 26. The line 22 is connected to the wheel brake cylinder 16. The flow path for the line 22 runs through a normally open microvalve 28, which serves as an apply microvalve. An outlet side of a pump 30 is connected to the line 26 via a conventional attenuator 30a and a conventional orifice 30b.

A line 32 branches from the line 22 between the apply microvalve 28 and the wheel brake cylinder 16. The flow path for the line 32 runs through a normally closed microvalve 34, which serves as a dump microvalve. Line 32 is in hydraulic communication with lines 36 and 38 which are connected to the inlet side of the pump 30 and a low pressure accumulator 40, respectively.

The line 24 similarly supplies the wheel brake cylinder 18. An apply microvalve 48 is interposed between the master cylinder 14 and the wheel brake cylinder 18 to selectively control the pressurized brake fluid supplied to the wheel brake cylinder 18. A dump microvalve 54 controls flow through a flow path from the line 24 between the apply microvalve 48 and the wheel brake cylinder 18, to the line 36 to the inlet side of the pump 30 and to the line 30 to the low pressure accumulator 40.

As indicated above, the rear wheel brake cylinders 17 and 19 are connected to the master cylinder 14 through the line 60. The rear brake circuit for the rear wheel brake cylinders 17 and 19 is configured somewhat differently in that the master cylinder 14 is connected to the brake cylinders 17 and 19 through a single line 70 and includes only a single pump 70, a conventional attenuator 70a, a conventional orifice 70b, a low pressure accumulator 80, an apply microvalve 68, and a dump microvalve 74 for both rear wheel brake cylinders 17 and 19.

The first embodiment has been described with respect to an ABS-capable braking system for a vertically split brake system with individual brake controls for the front wheel brake cylinders 16 and 18 and a dual brake control for rear wheel brake cylinders 17 and 19, one skilled in the art will appreciate that the rear wheel brake cylinders 17 and 19 may be alternately configured with individual brake controls similar to the front brake circuit described above. Similarly, the front brake circuits supplying the front wheel brake cylinders 16 and 18 may be alternately configured with a dual brake control similar to the rear brake circuit described above. Moreover, the brake system described in the first embodiment may be readily adapted to a diagonally split brake system with individual and/or dual brake controls.

The apply microvalves 28, 48, and 68, the dump microvalves 34, 54, and 74, and various sensors, including wheel speed sensors 42 and 44, and sensor 46, are electronically coupled to an electronic control unit (ECU) 90. Electrical connections to the ECU 90 are represented in FIG. 4 as dashed lines.

Operation of the ECU 90 for the first embodiment, generally, is as follows. The ECU 90 monitors the various sensors and is configured to respond to detected driving conditions by sending control signals which selectively actuate the microvalves. For example, the ECU 90 cycles through various modes in response to detecting an ABS event. Typically, an ABS event occurs when a wheel is about to lock. The ABS event may be detected, for example, by an unusual decrease in wheel speed during braking.

Although the various modes discussed below are described with reference to the wheel brake cylinder 16, the same modes are applicable to the wheel brake cylinder 18. Similar modes are also applicable to the rear wheel brake cylinders 17 and 19, however, these wheel brake cylinders are not individually controlled.

In normal brake mode, the pump 30 is turned off, the apply microvalve 28 is unactuated (and thus open), and the dump microvalve 34 is unactuated (and thus closed.) When the driver presses the brake pedal 11, pressure builds from the master cylinder 14 into the line 20. The pressure in the line 20 also builds through the line 22 to the wheel brake cylinder 16, passing through the normally open apply microvalve 28. The pressure does not pass through normally closed dump microvalve 34 into the lines 36 or 38.

When the brake pedal 11 is released, pressure in the master cylinder 14 is reduced, thereby reducing the pressure at the wheel brake cylinder 16. This reduction in pressure causes the pressure to be relieved from the wheel brake cylinder 16 to bleed off into the master cylinder 14 in the reverse flow direction of the brake path described above.

During a braking condition in which an ABS event is detected (for example, a slipping wheel), an ABS dump mode is entered to reduce the pressure in the brake wheel brake cylinder of the detected slipping wheel. For example, this may occur if the front wheel associated with the wheel brake cylinder 16 begins to slip during braking. In ABS dump mode, the apply microvalve 28 is actuated by the ECU 90 to a closed position to prevent the pressurized fluid in the line 20 from influencing pressure at the wheel brake cylinder 16.

Also, in the ABS dump mode, the dump microvalve 34 is intermittently energized (i.e. pulsed) by the ECU 90 to an open position to intermittently decrease the pressure at the wheel brake cylinder 16. While the dump microvalve 34 is pulsed open, the pressurized fluid in the wheel brake cylinder 16 bleeds off into the low pressure accumulator 40. Upon entering ABS dump mode, the pump 30 is turned on to assist in reducing the pressure on the wheel brake cylinder 16 by pulling fluid through the line 32 and to ensure that the low pressure accumulator 40 does not fill completely with fluid. The low pressure accumulator 40 allows rapid bleed off of brake fluid before the pump can begin to assist in the relieving of pressure on the wheel brake cylinder 16. The pump 30 returns the bled off brake fluid to lines 20 and 24 in addition to the master cylinder 14.

From the ABS dump mode, after a pre-determined condition, the ECU 90 enters into an ABS hold mode to maintain the braking fluid pressure at the wheel brake cylinder 16 at a constant level. The pre-determined condition may, for example, correspond to an amount of time determined to be necessary to reduce the pressure at the wheel brake cylinder 16 to an estimated desired pressure. In ABS hold mode, the apply microvalve 28 is deenergized to a closed position and the dump microvalve 34 is unactuated and assumes its normally closed position. This causes the pressure in the line 22 between the microvalve 28 and wheel brake cylinder 16 to remain at its current pressure level, thereby maintaining constant pressure at the wheel brake cylinder 16.

The ECU 90 continually monitors the braking condition and cyclically switches between the ABS dump mode and the ABS hold mode to relieve and maintain pressure at the wheel brake cylinder 16 in order to limit the wheel slippage. After the wheel stops slipping, the pressure to the wheel brake cylinder 16 can be increased again to maximize braking force. In order to accomplish this, the ECU 90 enters an ABS apply mode to apply additional pressure to the wheel brake cylinder 16.

In ABS apply mode, the dump microvalve 34 is deenergized and assumes its normally closed position. The apply microvalve 28 is initially deenergized (thereby assuming its normally open position) and is intermittently actuated (i.e. pulsed) to its closed position in order to control the application of additional pressure to the wheel brake cylinder 16. The pump 30, which was turned on in response to detection of an ABS event, remains on in order to provide additional fluid pressure from its outlet into the line 26.

Figure 4A:
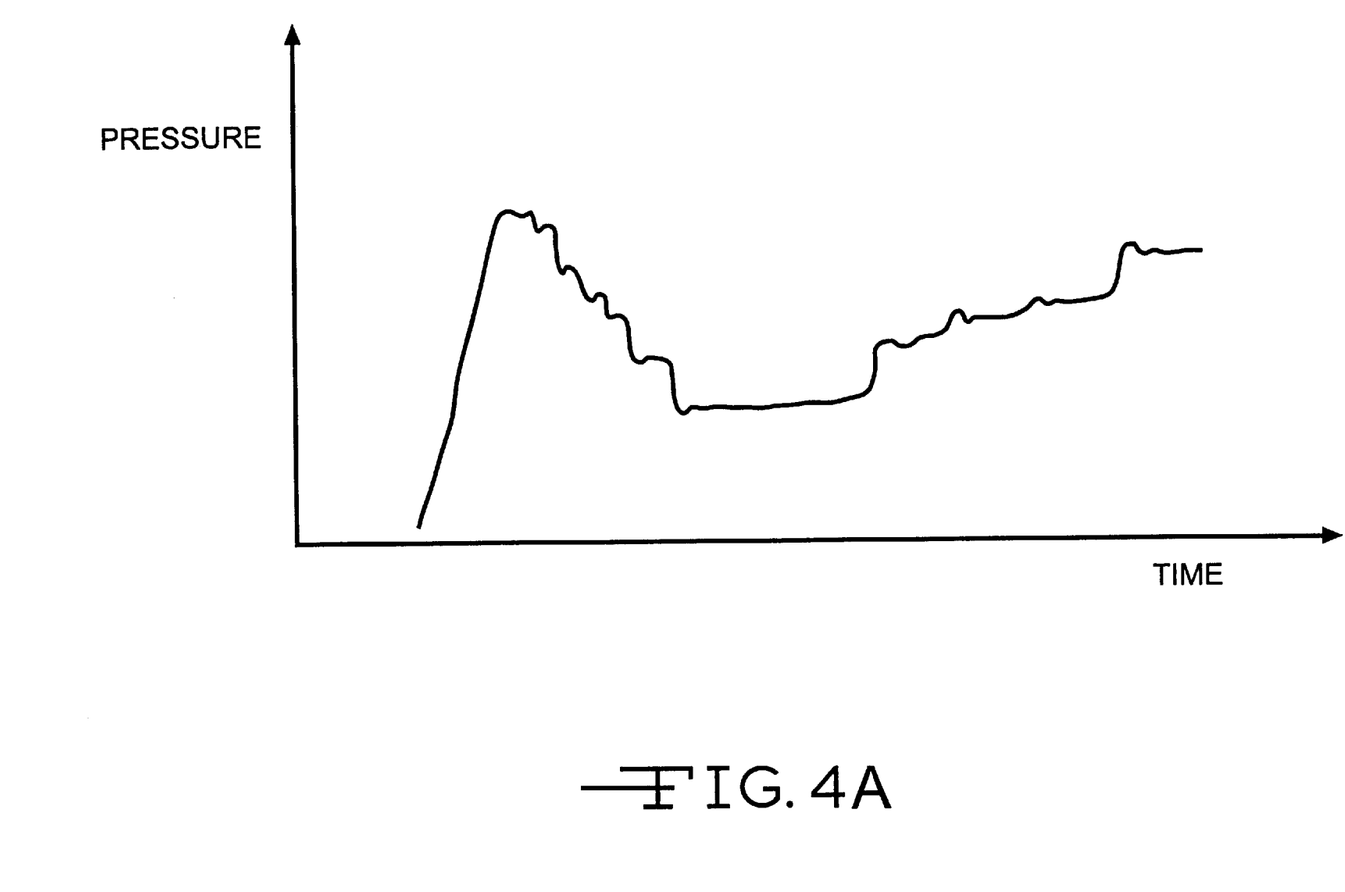
FIG. 4a is a graph of a predicted pressure profile from the electro-hydraulic brake system shown in FIG. 4.

FIG. 4*a* shows a predicted graph of a pressure profile from a brake system using microvalves according to the first embodiment of the invention. As shown in FIG. 4*a,* the pressure spikes are substantially eliminated and the ringing is substantially reduced. One skilled in the art will appreciate that the foregoing description of the operation of ECU 90 is exemplary only and other control methods are possible.

Figure 5:
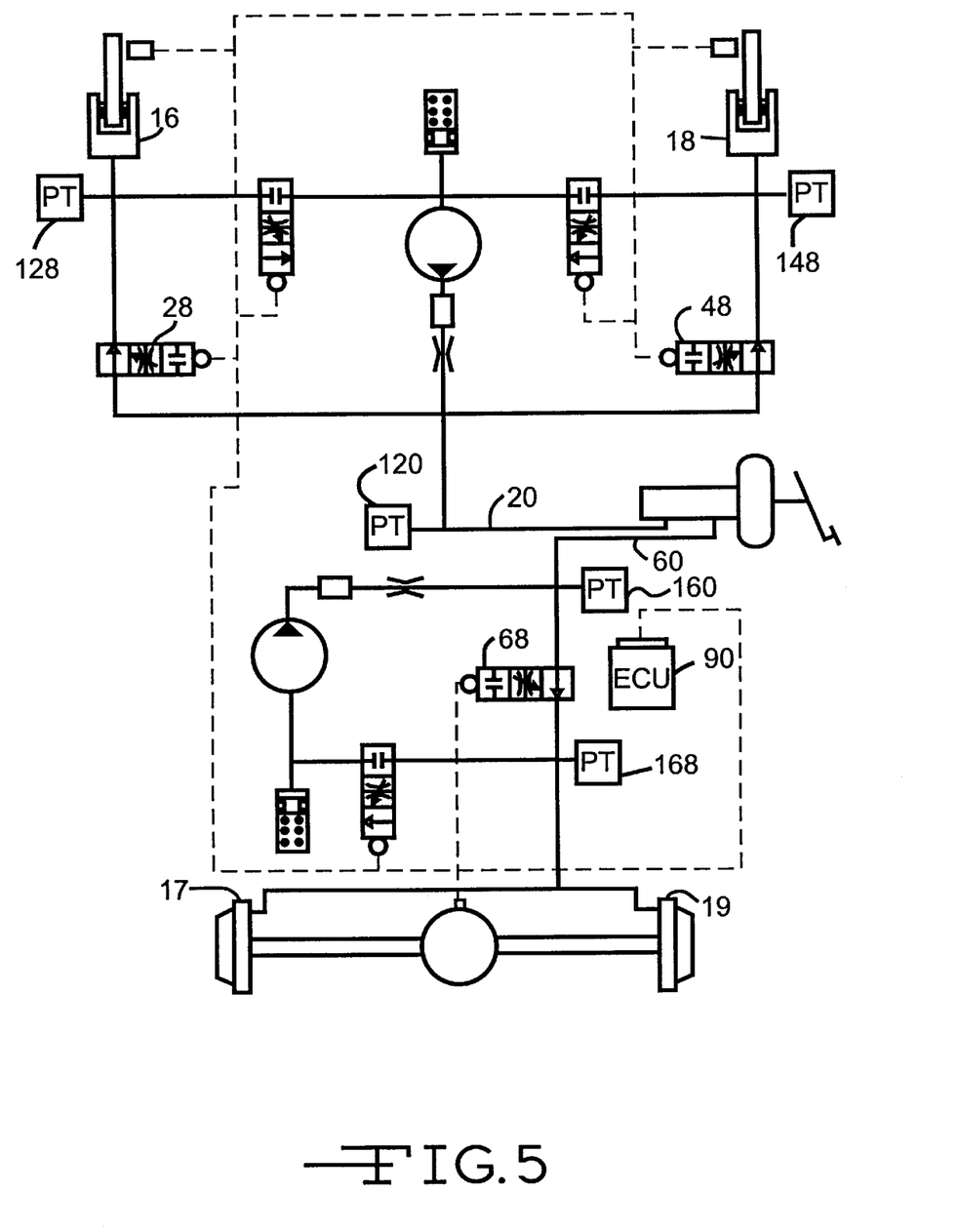
FIG. 5 is a schematic representation of a second embodiment of an electro-hydraulic brake system according to the invention.

FIG. 5 shows a schematic representation of a second embodiment of an ABS-capable braking system according to the invention. The second embodiment is similar to the first embodiment, but the second embodiment includes a number of pressure transducers. These pressure transducers may be micro-machined products fabricated from silicon or other suitable material. The circuit shown in FIG. 5 includes a pair of pressure transducers 120 and 160 connected to the lines 20 and 60, respectively. Also shown are pressure transducers 128 and 148 respectively connected to the lines 22 and 24 between the apply microvalves 28 and 48 and the wheel brake cylinders 16 and 18, respectively. A further pressure transducer 168 is connected to the line 60 between the apply microvalve 68 and the wheel brake cylinders 17 and 19. Each pressure transducer 120, 128, 148, 160, and 168 provides a respective signal (not shown) to the ECU 90 which indicates the fluid pressure sensed by the pressure transducer.

As shown in FIG. 5, the second embodiment according to the invention provides the advantage of being able to determine the actual fluid pressure present in the various brake lines. With the actual values, the ECU 90 can utilize the various pressure readings to better control the brake system. As described above with respect to the first embodiment, for example, the ECU 90 cycles between an ABS dump mode and an ABS hold mode based on a pre-determined amount of time estimated to be necessary to reduce the pressure at the wheel brake cylinder 16 to a desired pressure. However, in the second embodiment, the actual pressure at wheel brake cylinder 16 may be determined by pressure transducer 128. Therefore, the ECU 90 can better control the brake system by determining when to switch from an ABS dump mode to an ABS hold mode based on actual pressures as opposed to estimated pressures.

Moreover, the circuit shown in FIG. 5 can achieve better proportional control by utilizing the pressure transducers as shown in conjunction with proportionally controlled apply and dump microvalves. Specifically, by determining the actual pressures, the ECU 90 can make smoother adjustments between the current pressure and the desired pressure at the various points on the brake line.

Figure 5A:
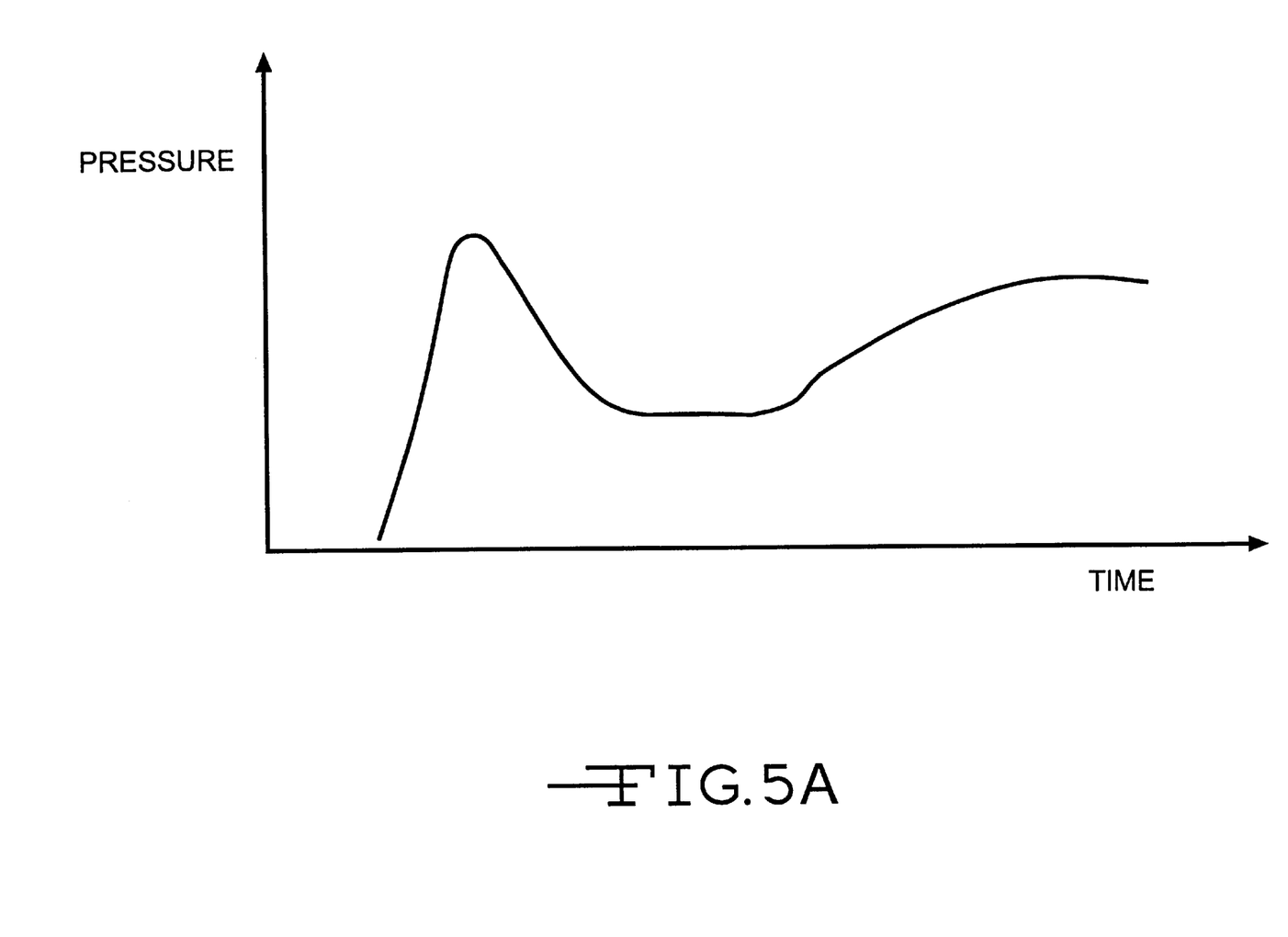
FIG. 5a is a graph of a predicted pressure profile from the electro-hydraulic brake system shown in FIG. 5.

FIG. 5*a* shows a predicted graph of a pressure profile from an ABS-capable braking system according to the second embodiment of the invention wherein proportionally controlled apply and dump microvalves and pressure transducers are utilized. As shown in FIG. 5*a,* both the pressure spikes and the ringing are substantially eliminated. Additional advantages in size and integration of the brake system may be achieved by fabricating at least some of the microvalves and the pressure transducers on the same silicon chip or integrated device.

Figure 6:
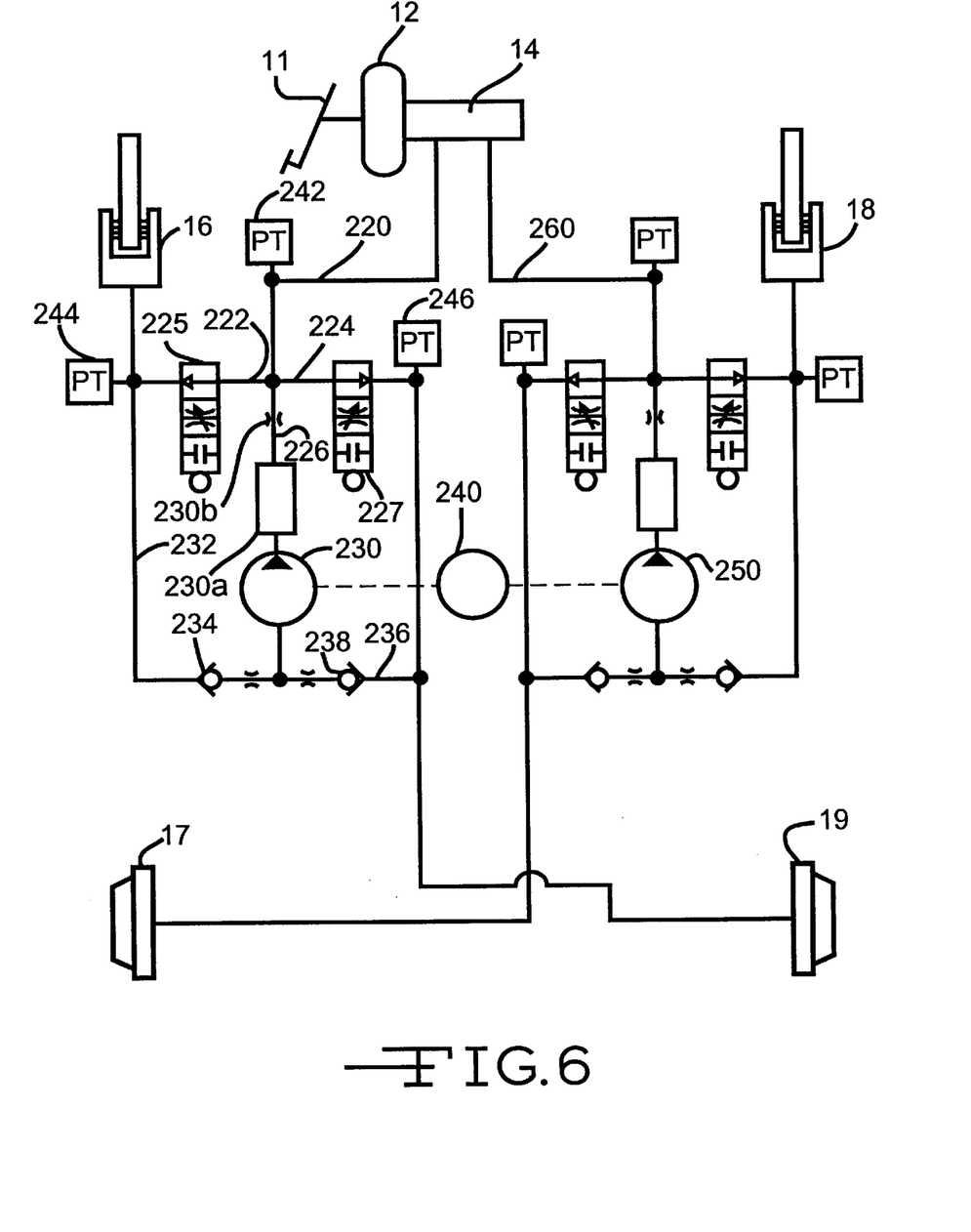
FIG. 6 is a schematic representation of a third embodiment of an electro-hydraulic brake system according to the invention.

FIG. 6 shows a schematic representation of a third embodiment of a hydraulic circuit according to the invention. The third embodiment according to the invention includes a brake pedal 11 which is connected to a brake booster 12 and a master cylinder 14. Similarly to the previously described braking systems, the master cylinder supplies pressurized fluid to the front wheel brake cylinders 16 and 18 and the rear brake cylinders 17 and 19. The master cylinder 14 is hydraulically connected to two similarly arranged separate brake circuits via the brake lines 220 and 260, respectively. The third embodiment is configured in a diagonally split arrangement in which diagonally opposed wheels are controlled by the same circuit. For the purpose of description, only the brake circuit for the front wheel brake cylinder 16 and the rear wheel brake cylinder 19 is discussed in detail below.

Wheel brake cylinders 16 and 19 are connected to the master cylinder 14 via the line 220, which is in hydraulic communication with three lines, i.e. lines 222, 224 and 226.

The line 222 is connected to the wheel brake cylinder 16. The flow path for the line 222 runs through a proportionally controlled microvalve 225. The line 224 hydraulically connects the line 220 to the wheel brake cylinder 19. The flow path for the line 224 runs through a proportionally controlled microvalve 227. The line 226 hydraulically connects the line 220 to the discharge of the pump 230.

A line 232 branches from the line 222 between the microvalve 225 and the wheel brake cylinder 16. The flow path for the line 232 runs through a one-way check valve 234 to an inlet side of the pump 230. A line 236 branches from the line 224 between the microvalve 227 and the wheel brake cylinder 19. The flow path for the line 236 runs through a one-way check valve 238 to the inlet side of the pump 230. As indicate above, the outlet side of the pump 230 is connected to the line 226, which includes a conventional attenuator 230a and a conventional orifice 230b. A motor 240 is coupled to the pump 230. Although a single motor 240 has been shown to drive the pumps 230 and a corresponding pump 250 used for the brake circuit for the wheel brake cylinders 18 and 17, separate motors may also be used for each pump.

The third embodiment optionally includes pressure transducers 242, 244, and 246 connected to the lines 220, 222, and 224, respectively, to determine the actual fluid pressure at the master cylinder 14 and the actual fluid pressure out of the microvalves 225 and 227 to the wheel brake cylinders 16 and 19, respectively. The third embodiment also includes an ECU (not shown) coupled to various sensors, including the pressure transducers 242, 244, and 246, and wheel speed sensors (not shown). The ECU is configured to monitor the various sensors and to respond to detected driving conditions by sending control signals which actuate the proportionally controlled microvalves 225 and 227.

Operation of the ECU for the third embodiment, generally, is as follows. The ECU cycles through various modes in response to detecting an ABS event. The ECU is initially in a normal brake mode. Under certain braking conditions, in which an ABS event is detected, the ECU will enter an ABS control mode to control the pressure applied to the brakes. The ABS control mode includes a controlled dump state, which relieves pressure on the brakes, and a controlled apply state, which builds pressure on the brakes. If the ABS event is no longer detected, the ECU returns to the normal brake mode.

In the normal brake mode, the pump 230 is turned off, the microvalve 225 is fully open, and the microvalve 227 is fully open. When the driver presses the brake pedal 11, pressure builds from the master cylinder 14 into the line 220. The pressure in the line 220 also builds through lines 222 and 224 to the wheel brake cylinders 16 and 19, passing through the fully open microvalves 225 and 227.

During a braking condition in which an ABS event is detected (i.e. a slipping wheel), the ABS control mode is entered to control the pressure at the wheel brake cylinders 16 and 19. In the ABS control mode, the pressures in the lines 220, 222, and 224 are detected by the transducers 242, 244, and 246, and the microvalves 225 and 227 are proportionally controlled depending on detected braking conditions. For example, if the wheel associated with the wheel brake cylinder 16 begins to slip, the ABS control mode may first enter a controlled dump state to relieve pressure at the wheel brake cylinder 16. In this state, the microvalve 225 is at least partially closed to restrict the flow of pressurized fluid from the master cylinder 14 to the wheel brake cylinder 16. The pump 230 is turned on to assist in relieving the pressure from the wheel brake cylinders 16 and 19. According to the invention, the microvalves 225 and 227 are separately controlled such that the pressures in the lines 222 and 224 may differ from each other depending on the detected braking conditions at the respective wheel brake cylinders 16 and 19.

Also in ABS control mode, it may become desirable to build brake pressure at one or both of the wheel brake cylinders 16 and 19. In this case, the brake system enters a controlled apply state. In order to achieve a controlled apply, the microvalve 225 is at least partially opened to allow the pressure from the master cylinder 14 to be applied to the wheel brake cylinder 16. The pump 230 is turned off to cause pressure to build. As noted above, the microvalves 225 and 227 are separately controlled such that the pressures in the lines 222 and 224 may differ from each other depending on the detected braking conditions at the respective wheel brake cylinders 16 and 19.

Depending on the braking conditions detected at each wheel, while in the ABS control mode, the ECU can, for example, relieve pressure from the wheel brake cylinder 16 and simultaneously build pressure at the wheel brake cylinder 19. In this case, the pump 230 would remain on to assist in relieving pressure from wheel brake cylinder 16. The microvalve 225 would be at least partially closed to reduce the pressure being applied from the master cylinder 14. The microvalve 227 would be at least partially open to allow the pressure from the master cylinder 14 to be applied to the wheel brake cylinder 8.

Figure 7:
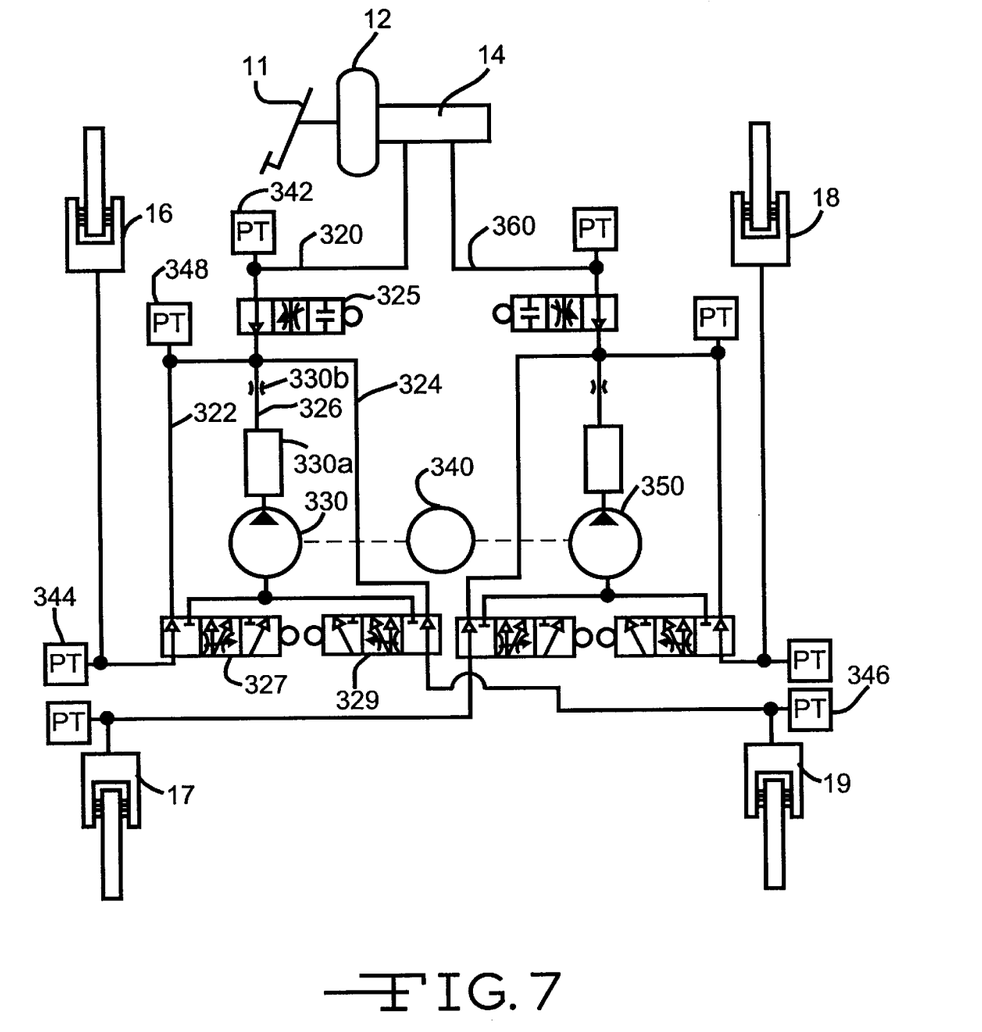
FIG. 7 is a schematic representation of a fourth embodiment of an electro-hydraulic brake system according to the invention.

FIG. 7 shows a schematic representation of a fourth embodiment of a hydraulic brake system according to the invention. The fourth embodiment according to the invention includes a brake pedal 11 which is connected to a brake booster 12 and a master cylinder 14. The master cylinder 14 is connected to two similarly arranged separate brake circuits via the brake lines 320 and 360, respectively. The fourth embodiment is configured in a diagonally split arrangement in which diagonally opposed wheels are controlled together. For the purpose of description, only the brake circuit for the wheel brake cylinder 16 and the wheel brake cylinder 19 is discussed in detail below.

The wheel brake cylinders 16 and 19 are connected to the master cylinder 14 via the line 320, which is in hydraulic communication with three lines, i.e. lines 322, 324, and 326. Before the line 320 divides, the flow in the line 320 passes through a proportionally controlled microvalve 325. The line 322 hydraulically connects the line 320 to the wheel brake cylinder 16. The flow path for the line 322 runs through a proportionally controlled 3-way changeover microvalve 327. The Line 324 hydraulically connects the line 320 to the wheel brake cylinder 19. The flow path for the line 324 runs through a proportionally controlled 3-way changeover microvalve 329.

The changeover valves 327 and 329 are each configured with a changeover fluid path to an inlet side of the pump 330. An outlet of the pump 330 is connected to the line 326, which includes a conventional attenuator 330a and a conventional orifice 330b. A motor 340 is coupled to the pump 330. Although a single motor 340 has been shown for the pumps 330 and a corresponding pump used in the brake circuit for wheel brake cylinders 18 and 17, separate motors may also be used for each pump.

The fourth embodiment optionally includes pressure transducers 342, 344, and 346 connected on the lines 220, 222, and 224, respectively. The pressure transducers are used to determine the actual fluid pressure at the master cylinder 14 and at the wheel brake cylinders 16 and 19, respectively. A fourth pressure transducer 348, is connected at the point where the line 320 divides into the lines 322, 324, and 326, to determine the pressure at that point. The fourth embodiment also includes an ECU (not shown) coupled to various sensors, including the pressure transducers 342, 344, 346, and 348 and wheel speed sensors (not shown). The ECU is configured to monitor the various sensors and to respond to detected driving conditions by sending control signals which proportionally actuate the microvalves 325, 327, and 329.

Operation of the fourth embodiment of the braking system generally, is as follows. The ECU cycles through various modes in response to detecting an ABS event. The ECU is initially in a normal brake mode. Under certain braking conditions, in which an ABS event is detected, the ECU will enter an ABS control mode to control the pressure applied to the brakes. The ABS control mode includes a controlled dump state, which relieves pressure on the brakes, and a controlled apply state, which builds pressure on the brakes. In the fourth embodiment, the ECU may enter an ABS full dump state to more quickly relieve the pressure at the brakes. If the ABS event is no longer detected, the ECU returns to the normal brake mode.

In the normal brake mode, the pump 330 is turned off, the microvalve 325 is fully open, the changeover microvalve 327 is fully open to the wheel brake cylinder 16, and the changeover microvalve 329 is fully open to the wheel brake cylinder 19. When the driver presses the brake pedal 11, pressure builds from the master cylinder 14 into the line 320. The pressure in the line 320 also builds through the lines 322 and 324 to the wheel brake cylinders 16 and 19, passing through the fully open microvalve 325 and the fully open microvalves 327 and 329.

During a braking condition in which an ABS event is detected (i.e. a slipping wheel), the ABS control mode is entered to control the pressure at the wheel brake cylinders 16 and 19. In ABS control mode, the pressures in the brake lines are detected by the transducers and the microvalves 325, 327, and 329 are proportionally controlled depending on detected braking conditions. For example, the ABS control mode may enter a controlled dump state to relieve pressure at the wheel brake cylinders 16 and 19. In this state, the microvalve 325 is at least partially closed and the microvalves 327 and 329 are at least partially changed over to a restricted flow state so as to reduce the pressure being applied from the master cylinder 14 to the wheel brake cylinders 16 and 19. The pump 330 may be turned on to assist in relieving the pressure. According to the invention, the microvalves 327 and 329 are separately controlled such that the pressures in the lines 322 and 324 may differ from each other depending on the detected braking conditions at the respective wheel brake cylinders 16 and 19.

Also in ABS control mode, it may become desirable to build brake pressure at one or both of the wheel brake cylinders 16 and 19. In this case, the ABS control mode enters a controlled apply state. In order to achieve a controlled apply, the microvalve 325 is at least partially closed and the microvalves 327 and 329 are at least partially closed to restrict the flow from the master cylinder 14 to the wheel brake cylinders 16 and 19. According to the fourth embodiment of the invention, pressure is built even when the pump 330 remains turned on. As noted above, the microvalves 327 and 329 are separately controlled and the pressures in the brake lines may differ from each other depending on the detected braking conditions at the respective wheel brake cylinders 16 and 19.

Depending on the braking conditions detected at each wheel, while in the ABS control mode, the ECU can, for example, relieve pressure from the wheel brake cylinder 16 and simultaneously build pressure at the wheel brake cylinder 19. In this case, the pump 330 would remain on to assist in relieving pressure from the wheel brake cylinder 16. The microvalve 327 would be at least partially changed over to reduce the pressure being applied from the master cylinder 14 to the wheel brake cylinder 16. The microvalve 329 would be at least partially closed so as to restrict flow supplied to the wheel brake cylinder 19. The microvalve 325 would be partially opened or partially closed depending on the pressures detected by the pressure transducers. For example, pressure relieved from the wheel brake cylinder 16 may be applied to the wheel brake cylinder 19. However, if more pressure is required at the wheel brake cylinder 19, the microvalve 325 would be partially opened to apply additional pressure.

In the fourth embodiment, the ECU provides an ABS full mode to quickly relieve the pressure at the wheel brake cylinders 16 and 19. In the ABS full dump mode, the microvalve 325 is fully open and the microvalves 327 and 329 are fully changed over to prevent pressure from the master cylinder 14 from being applied to the wheel brake cylinders 16 and 19. The pump 330 remains turned on to bleed brake fluid from the wheel brake cylinders 16 and 19 back to the master cylinder 14 and thereby relieving brake pressure on the brakes.

Figure 8:
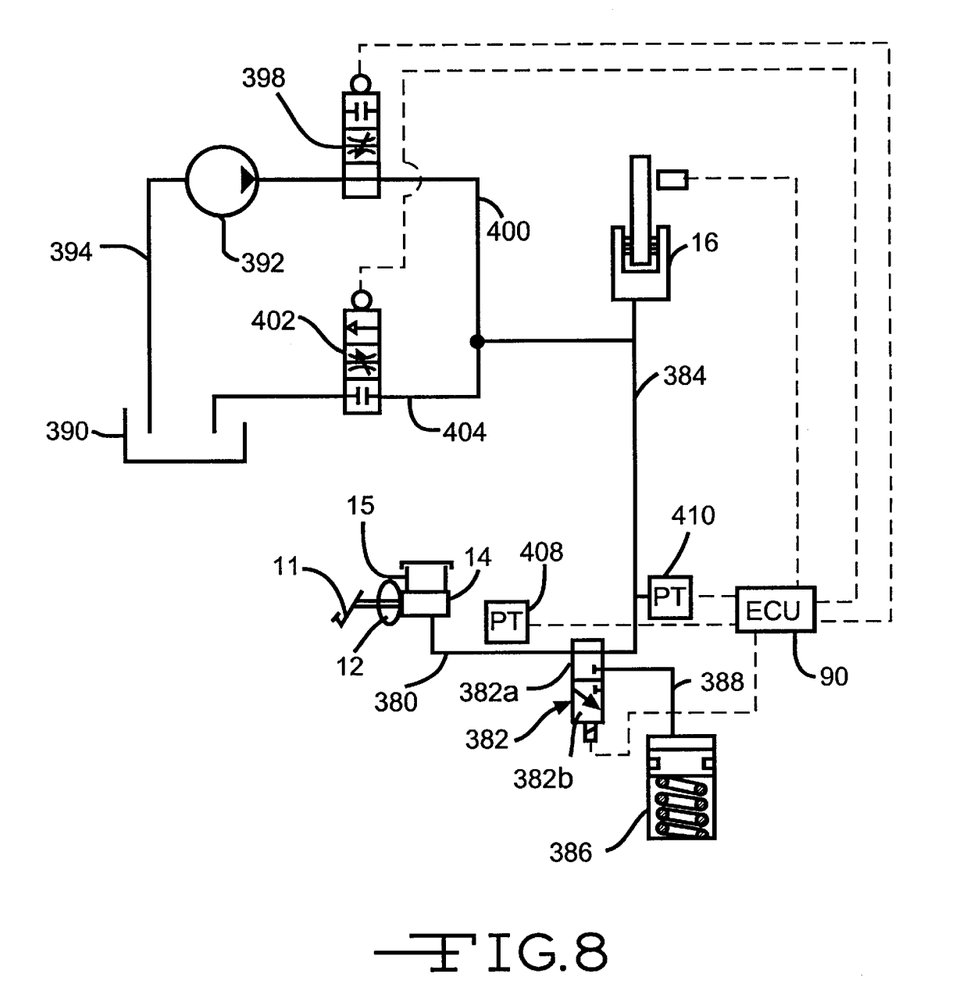
FIG. 8 is a schematic representation of a fifth embodiment of an electronic brake management system according to the invention.

FIG. 8 shows a schematic representation of a fifth embodiment of a hydraulic brake system according to the invention. The fifth embodiment according to the invention includes a brake pedal 11 which is connected to a brake booster 12 and a master cylinder 14. The master cylinder 14 is separately connected to two or more similarly arranged brake circuits. For the purpose of description, only the brake circuit for wheel brake cylinder 16 via brake line 380 is discussed below. The brake pedal 11 actuates the master cylinder 14 which pressurizes fluid in the main brake conduit 380 when the driver steps on the brake pedal 11. A brake fluid reservoir 15 holds a supply of brake fluid and is connected to the master cylinder 14 in a known manner. The main conduit 380 connects the master cylinder 14 to a changeover valve 382, which may be implemented as a 2-position, 3-way solenoid-operated valve. Preferably, however, the changeover valve 282 is implemented as a 2 position, 3-way microvalve shown schematically in FIG. 8. A second conduit 384 connects the changeover valve 382 to the wheel brake cylinder 16. The changeover valve 382 has a normal, unactuated position 382a which allows the master cylinder 14 to communicate with the wheel brake cylinder 16. A pressure accumulator which acts as a pedal simulator 386 is connected to the changeover valve 382 via a third conduit 388. The changeover valve 382 has a second, actuated position 382b which connects the master cylinder 14 to the pedal simulator 386 and disconnects the master cylinder 14 from the wheel brake cylinder 16. The master cylinder 14 may act as a backup supply of pressurized hydraulic fluid to the wheel brake cylinder 16.

The illustrated braking system shown in FIG. 8 also includes a circuit which provides a normal source of pressurized hydraulic fluid to the wheel brake cylinder 16 during braking conditions. The hydraulic fluid is supplied to the wheel brake cylinder 16 from a tank 390. A pump 392 is hydraulically connected to the tank 390 through a line 394. A first proportionally controlled microvalves 398 is provided on a line 400 between the pump 392 and the wheel brake cylinder 16. A second microvalve 402 is provided on a line 404 which connects the line 400 to the tank 390. The embodiment illustrated in FIG. 8 optionally includes pressure transducers 408 and 410 connected on the lines 380 and 384, respectively. The pressure transducers are used to determine the actual fluid pressure at the master cylinder 14 and the wheel brake cylinder 16, respectively.

During normal braking, the driver applies the brakes by stepping on the brake pedal 11, which causes the master cylinder 14 to pressurize the fluid in conduit 380. This action causes an initial percentage of fluid pressure to be applied to the brake piston. The pressure sensor 408 signals the ECU 90, which actuates the valve 382 to the position 382b, thereby disconnecting the master cylinder 14 from the wheel brake cylinder 16. The actuated changeover valve 382 connects the master cylinder 14 to the pedal simulator 386. As the driver presses the brake pedal 11, the pedal simulator 386 receives the pressurized fluid generated by the master cylinder 14 and provides a progressively increasing load against the master cylinder 14 to create the "pedal feel". The ECU 90 provides a control signal to the microvalves 398 and 402 which causes pressurized fluid to be supplied to the wheel brake cylinder 16. Using pressure information from sensors 410, the ECU 90 can control the operation of the microvalves 398 and 402 to generate the same fluid pressure at the wheel brake cylinder 16 that is conventionally produced by the master cylinder 14. When the driver steps off the brake pedal 11, the master cylinder 14 no longer pressurizes the brake fluid and the excess fluid in the pedal simulator 386 flows back to the master cylinder reservoir 15. The ECU 90 receives the pressure signal from the sensor 408 indicating a reduction in pressure by the master cylinder 14 and control the microvalves 398 and 402 so as to release the brake at the wheel brake cylinder 16, e.g. by closing the microvalve 398 and opening the microvalve 402 to relieve pressure at the wheel brake cylinder 16 back to the tank 390. The changeover valve 382 is then deactuated to position 382a.

In addition to the braking systems described above, one or more microvalves could be employed in an Electronically Controlled Hydraulic Boost braking system (ECHB). In a conventional hydraulic vehicle brake system, the braking force developed by the system is generally proportional to the force applied by the vehicle operator on a vehicle brake pedal. The pedal is linked to the piston in the master cylinder which moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. Typically, this is accomplished by incorporating either a vacuum or hydraulically operated boost piston assembly to act on the linkage between the brake pedal and the master cylinder.

In an ECHB braking system, a sensor sense the brake demand of the driver, for example, by monitoring one or both of the movement of the brake pedal by the driver and the brake pedal force exerted by the driver. The driver's brake demand signal is supplied to an electronic controller (not shown). The electronic controller, like the ECU 90, may also be supplied by brake demand signals which are not driver demanded, but come from other systems such as hill hold, collision avoidance, intelligent cruise control, automatic guidance systems and the like. In turn, in a hydraulic boost system, the electronic controller controls a demand signal to a pressure control valve (not shown). This pressure control valve regulates the pressure of the brake fluid supplied from source of high pressure fluid to a brake boost piston (not shown). The brake boost piston when supplied with high pressure fluid, assist the driver in actuating the master cylinder. The amount of boost is controlled by the pressure control valve, which in turn, is controlled as described above, by the electronic controller. In this type of braking system according to the invention, a microvalve may be used as the pressure control valve so as to reduce packaging size, reduce power consumption and improve reliability.

In accordance with the provisions of the patent statutes, the principle and mode of operation of this invention have been explained and illustrated in its preferred embodiment. Although the invention has been described with respect to the specific embodiments discussed above, one skilled in the art will appreciate that other embodiments are possible without departing from the spirit and scope of the invention. For example, while the third and fourth embodiments have been described as utilizing proportionally controlled microvalves, non-proportionally controlled microvalves may be used with an ECU configured to control such microvalves.

What is claimed is:

1. An hydraulic braking system comprising:
   a braking device adapted to provide a braking force to at least one wheel for braking the vehicle;
   at least one main hydraulic conduit extending from a source of pressurized brake fluid to said braking device, said source and said main hydraulic conduit cooperating to supply pressurized fluid to said braking device; and
   at least one thermally actuated microvalve disposed in said main hydraulic conduit between said source and said braking device, said microvalve selectively controlling the pressurized brake fluid supplied to said braking device.

2. The hydraulic braking system defined in claim 1 wherein said microvalve has at least three operating states, said operating states including an open state, a flow restricted state, and a closed state.

3. The hydraulic braking system defined in claim 2 wherein said flow restricted state is variable.

4. The hydraulic braking system defined in claim 3 wherein said microvalve provides proportional control between a first fluid path and a second fluid path and said three operating states includes a fully open state to said first fluid path with a fully closed state to a second fluid path, a variable flow restricted state to said first fluid path and said second fluid path, and a fully closed state to said first fluid path with a fully open state to said second fluid path.

5. The hydraulic braking system defined in claim 1 further including an apply microvalve disposed on said main hydraulic conduit for controlling the supply of the pressurized brake fluid from said source of pressurized brake fluid to said braking device and a dump microvalve disposed on said main hydraulic conduit between said apply microvalve and said braking device for relieving the pressure of the brake fluid at said braking device.

6. The hydraulic braking system defined in claim 5 further including a wheel speed sensor and an electronic control unit adapted to generate one or more electrical output signals in response to a plurality of electrical input signals, said electronic control unit receiving separate input signals which are representative of an amount of brake force demand and wheel speed and said electronic control unit sending an output signal to each of said apply microvalve and said dump microvalve to selectively control the pressurized brake fluid supplied to said braking device for effecting said braking force.

* * * * *